(12) United States Patent
Drichel et al.

(10) Patent No.: US 9,773,187 B2
(45) Date of Patent: Sep. 26, 2017

(54) METHOD AND APPARATUS FOR OCR DETECTION OF VALUABLE DOCUMENTS BY MEANS OF A MATRIX CAMERA

(75) Inventors: Alexander Drichel, Bielefeld (DE); Steffen Priesterjahn, Paderborn (DE)

(73) Assignee: Wincor Nixdorf Intenational GmbH, Paderborn (DE)

( * ) Notice: Subject to any disclaimer, the term of this patent is extended or adjusted under 35 U.S.C. 154(b) by 0 days.

(21) Appl. No.: 14/233,982

(22) PCT Filed: Jul. 17, 2012

(86) PCT No.: PCT/EP2012/063976
§ 371 (c)(1),
(2), (4) Date: Apr. 7, 2014

(87) PCT Pub. No.: WO2013/011013
PCT Pub. Date: Jan. 24, 2013

(65) Prior Publication Data
US 2014/0219540 A1 Aug. 7, 2014

(30) Foreign Application Priority Data
Jul. 19, 2011 (DE) ........................ 10 2011 051 934

(51) Int. Cl.
*G06K 9/00* (2006.01)
*G06K 9/46* (2006.01)
*G06K 9/32* (2006.01)

(52) U.S. Cl.
CPC ....... *G06K 9/4604* (2013.01); *G06K 9/00442* (2013.01); *G06K 9/3233* (2013.01);
(Continued)

(58) Field of Classification Search
None
See application file for complete search history.

(56) References Cited

U.S. PATENT DOCUMENTS 4,907,156 A * 3/1990 Doi et al. ............. 382/130
5,506,918 A    4/1996 Ishitani
(Continued)

FOREIGN PATENT DOCUMENTS

| DE | 195 32 342 | 5/1996 |
|---|---|---|
| DE | 100 10 621 | 9/2000 |
| DE | 10 2004 020 034 | 11/2005 |

OTHER PUBLICATIONS

Nina, Oliver, "Text Segmentation of Historical Degraded Handwritten Documents" (2010). All Theses and Dissertations. Paper 2585. http://scholarsarchive.byu.edu/etd/2585.*
(Continued)

*Primary Examiner* — Sumati Lefkowitz
*Assistant Examiner* — Carol Wang
(74) *Attorney, Agent, or Firm* — Black, McCuskey, Souers & Arbaugh, LPA

(57) ABSTRACT

The invention relates to a method for OCR detection of valuable documents in a cash dispenser in the case of which an image of the valuable document is detected by means of a digital video or matrix camera. A Hough transformation is used to calculate edge lines of the valuable document and a rotation angle is calculated therefrom such that the edges of the valuable document are aligned with the image edges. The detected image is homogenized to compensate an inhomogeneous image background. This is followed by OCR detection of alphanumeric information on the valuable document.

5 Claims, 17 Drawing Sheets

(52) U.S. Cl.
CPC ......... *G06K 9/3275* (2013.01); *G06K 9/4633* (2013.01); *G06K 2209/01* (2013.01)

(56) References Cited

U.S. PATENT DOCUMENTS

| | | | |
|---|---|---|---|
| 5,740,271 A * | 4/1998 | Kunkler et al. | 382/137 |
| 6,118,886 A * | 9/2000 | Baumgart et al. | 382/103 |
| 6,178,270 B1 | 1/2001 | Taylor et al. | |
| 6,275,334 B1 | 8/2001 | Park | |
| 6,301,386 B1 * | 10/2001 | Zhu | G06K 9/342 |
| | | | 382/173 |
| 6,343,139 B1 | 1/2002 | Finkelstein et al. | |
| 7,494,052 B1 | 2/2009 | Carpenter et al. | |
| 8,162,125 B1 * | 4/2012 | Csulits | G07D 7/0033 |
| | | | 194/206 |
| 8,688,579 B1 * | 4/2014 | Ethington et al. | 705/42 |
| 2002/0025080 A1 | 2/2002 | Horie | |
| 2002/0037097 A1 | 3/2002 | Hoyos et al. | |
| 2005/0025364 A1 * | 2/2005 | Kim et al. | 382/190 |
| 2005/0169531 A1 | 8/2005 | Fan | |
| 2005/0206753 A1 * | 9/2005 | Sakurai | G06T 3/00 |
| | | | 348/241 |
| 2005/0279162 A1 * | 12/2005 | Petrinic et al. | 73/159 |
| 2006/0045357 A1 * | 3/2006 | Schwartz | G06T 7/0081 |
| | | | 382/232 |
| 2006/0153435 A1 * | 7/2006 | Wallmark et al. | 382/129 |
| 2006/0257044 A1 * | 11/2006 | Chiu | 382/261 |
| 2007/0053586 A1 * | 3/2007 | Makino | G06T 7/0083 |
| | | | 382/167 |
| 2008/0018941 A1 | 1/2008 | Tayloer | |
| 2008/0239330 A1 * | 10/2008 | Sato | H04N 1/0036 |
| | | | 358/1.1 |
| 2009/0252437 A1 * | 10/2009 | Li | G06K 9/3283 |
| | | | 382/289 |
| 2010/0195918 A1 | 8/2010 | Yonezawa et al. | |
| 2010/0215261 A1 * | 8/2010 | Kim | G06K 9/4642 |
| | | | 382/165 |
| 2011/0110595 A1 | 5/2011 | Kim et al. | |
| 2011/0123114 A1 | 5/2011 | Hwang et al. | |
| 2012/0087537 A1 * | 4/2012 | Liu et al. | 382/100 |

OTHER PUBLICATIONS

German Search Report dated Jul. 16, 2012.
Zhang Junyou—"A Quickly Skew Correction Algorithm of Bill Image"—2010 Third International Conference on Information and Computing—pp. 185-188, Jun. 2010.
Adnam Rashit et al.—"A Real-Time Embedded Solution for Skew Correction in Banknote Analysis"—pp. 42-49, Jun. 2011.
Written Opinion, dated Jan. 19, 2014.

* cited by examiner

Fig. 6k

METHOD AND APPARATUS FOR OCR DETECTION OF VALUABLE DOCUMENTS BY MEANS OF A MATRIX CAMERA

BACKGROUND

1. Field of the Invention

The invention relates in general to the detection of valuable documents such as, for example, checks or banknotes in self-service machines, in particular cash dispensers or automatic teller machines, and relates in particular to the detection of digital images of valuable documents by means of a video or matrix camera, and preprocessing thereof in self-service machines, in particular cash dispensers.

2. Description of the Related Art

Valuable documents in cash dispensers are usually detected by means of line cameras which scan in valuable documents line by line in the manner of a flat bed scanner. These detection modules require exact alignment of the valuable documents in respect of the line direction of the image sensor. This can therefore be implemented easily by means of mechanical guiding and centering aids because the latter can be arranged outside the comparatively narrow detection region for detecting a scanned line.

However, such image sensors are comparatively costly, which renders it desirable to detect images by means of conventional video or matrix cameras, given that the latter can be obtained cost-effectively.

DE 100 10 621 B4 discloses a method for quickly locating address blocks in grayscale images, which method is based on the finding that text generally contains both horizontally dominant and vertically dominant points in approximately equal values. Text kernels are marked in the method which comprise a group of starting points in fixed mutual proximity, there being for each starting point at least one horizontally dominant point and at least one vertically dominant point. This text kernel is then used to undertake an OCR detection. The grayscale image is acquired by means of a line camera in this method.

DE 195 32 342 C1 discloses an imaging system for automatic address detection on large letters and parcels with the aid of a high-resolution grayscale value camera and a low-resolution color camera. Both cameras are aligned with a light slit past which the object to be processed is guided. The color camera is operated in a special mode which enables the use of only one common light slit, an adequate light intensity being provided for both cameras. The signal of the multiplicity of elements of a color picture line is integrated over time and electronically averaged after the exposure. However, this design is comparatively expensive.

DE 10 2004 020 034 A1 discloses a scanner for digitally reading a newspaper which is deposited on an original table. A camera module has two sensors directed onto the original table and on which a region of the original table is respectively imaged via an optical system. Furthermore provided is an illuminating module which has at least two illuminating units which are arranged in parallel with a connecting line of the sensors on opposite sides of the camera module and are directed onto the original table. The aim of this is to realize homogeneous illumination of the original newspaper. In order further to homogenize illumination, it is possible for camera and illumination modules to be moved in a secondary scanning direction parallel to the surface of the original table, the regions imaged on the sensors sweeping over at least one predetermined region on the original table. An exact alignment of the original is possible owing to the use of an original table with well-defined edges, as well as a lay-on edge.

It is an object of the present invention to provide a method and an apparatus for OCR detection of valuable documents in a self-service machine, in particular a cash dispenser or automatic teller machine, which can be used to reliably detect valuable documents such as, for example, checks or else banknotes, by means of a video or matrix camera in a simple and cost-effective way.

SUMMARY OF THE INVENTION

According to the present invention, it is possible in particular to compensate for the facts that the background of an image, recorded by means of a video or matrix camera, of a valuable document depends on the illumination and is therefore inhomogeneous, that the object does not always lie properly aligned under the camera and perspective and/or radial distortions also result depending on camera position, and that the resolution of the acquired image decreases towards the edge.

The invention is described below in an exemplary way and with reference to the attached drawings from which further features, advantages and objects to be achieved emerge.

BRIEF DESCRIPTION OF THE DRAWINGS

FIGS. 6a-6l show results of diverse method steps according to the present invention with the aid of an example for the detection of a check in the so-called Bolletini check format.

DETAILED DESCRIPTION OF THE PREFERRED EMBODIMENTS

Figure 1:
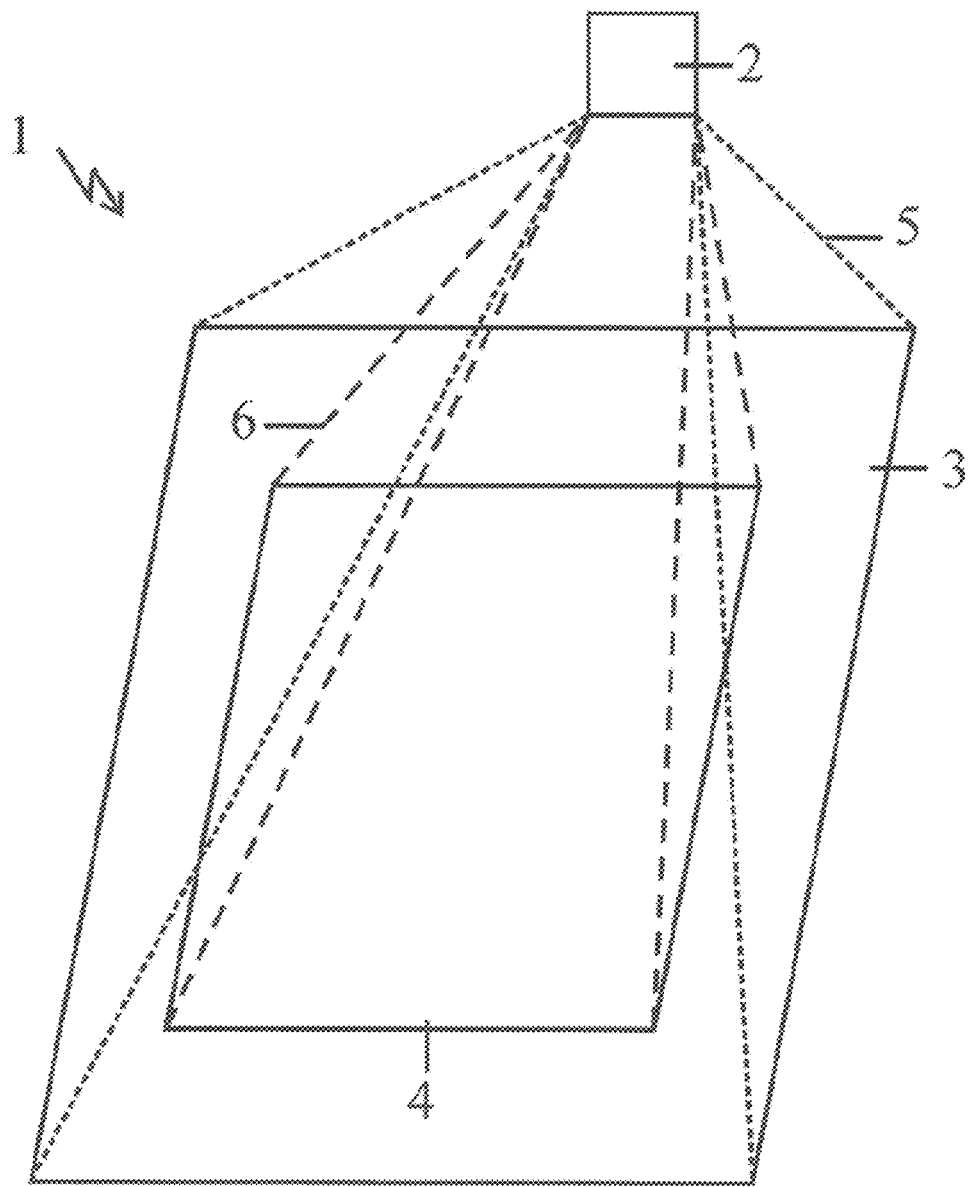
FIG. 1 is a schematic of the detection of a valuable document deposited on a depositing plate by means of a video or matrix camera in a valuable document detection module in accordance with the present invention.

In accordance with FIG. 1, the matrix or video camera 2 arranged above or below the depositing plate 3 acquires the valuable document 4 deposited on the depositing plate 3, the field of view 5 of the camera 2 extending up to the edges of the latter and being larger than customary valuable documents 4 to be detected. The latter are usually not aligned exactly with the edges of the depositing plate 3 but rather are tilted, a circumstance that must be taken into account. The background of such an image acquired with the aid of the camera 2 is dependent on the illumination and inhomogeneous. Depending on the camera position, moreover, perspective and radial distortions occur in the acquired image. Moreover, the resolution of the image decreases toward the edge.

Figure 2:
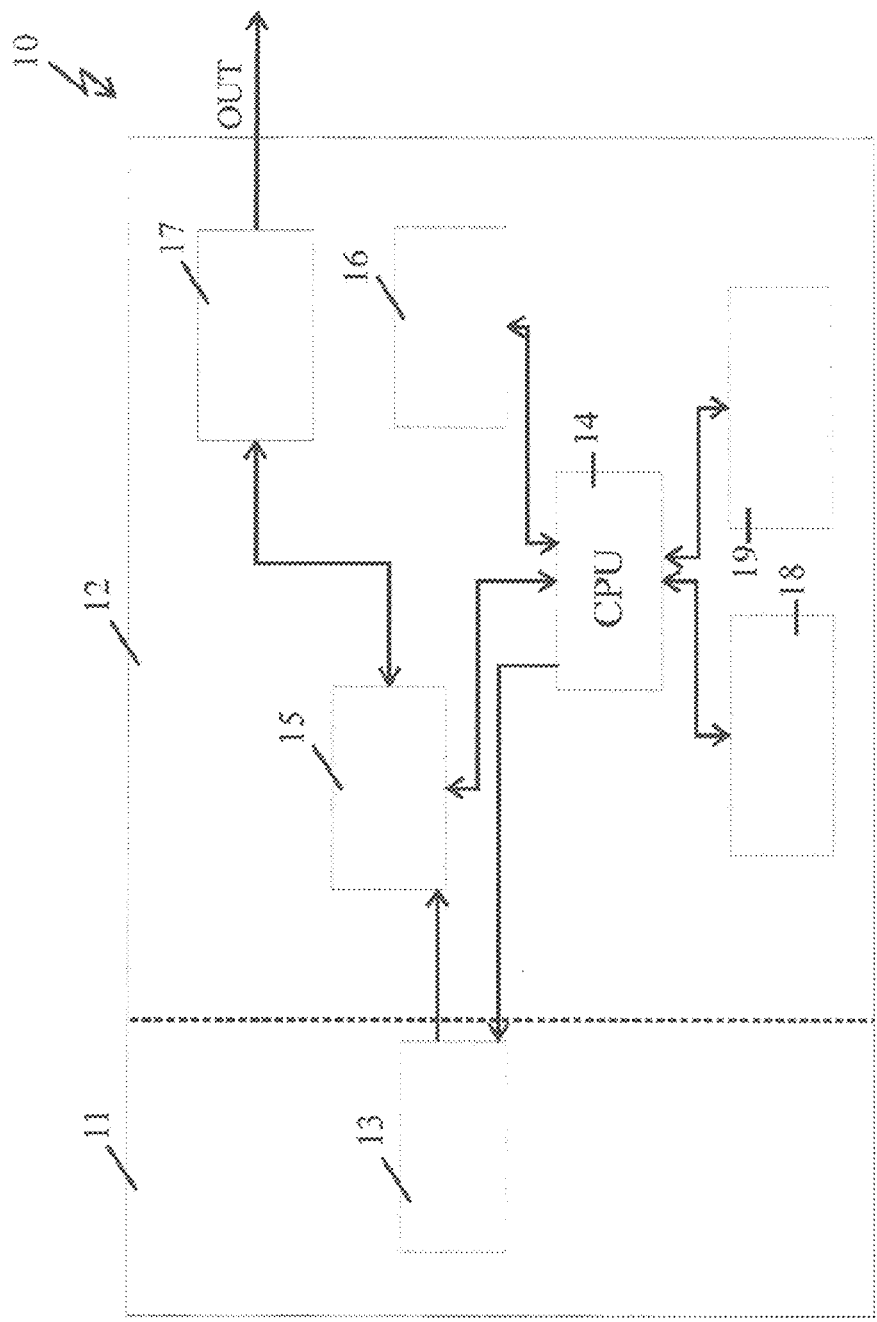
FIG. 2 is a schematic block diagram of an image evaluation module of an inventive valuable document detection module.

The camera 2 with its image sensor 13 corresponds to an image signal generator 11 of the image evaluation module 10 shown in FIG. 2. The image sensor 13 acquires a digital image of the valuable document with a predetermined resolution. The digital images thus acquired are firstly buffered in the memory 15 and subsequently processed further in an image processing section 16. The data processing section 12 of the image evaluation module 10 further comprises a central control device (CPU) 14 which is connected to a program code memory 18, in which program code instructions for executing the inventive method are stored, a control section 19, for example for presetting the image evaluation module 10, the image processing section 16, the memory 15 and an image output device 17.

Figure 3:
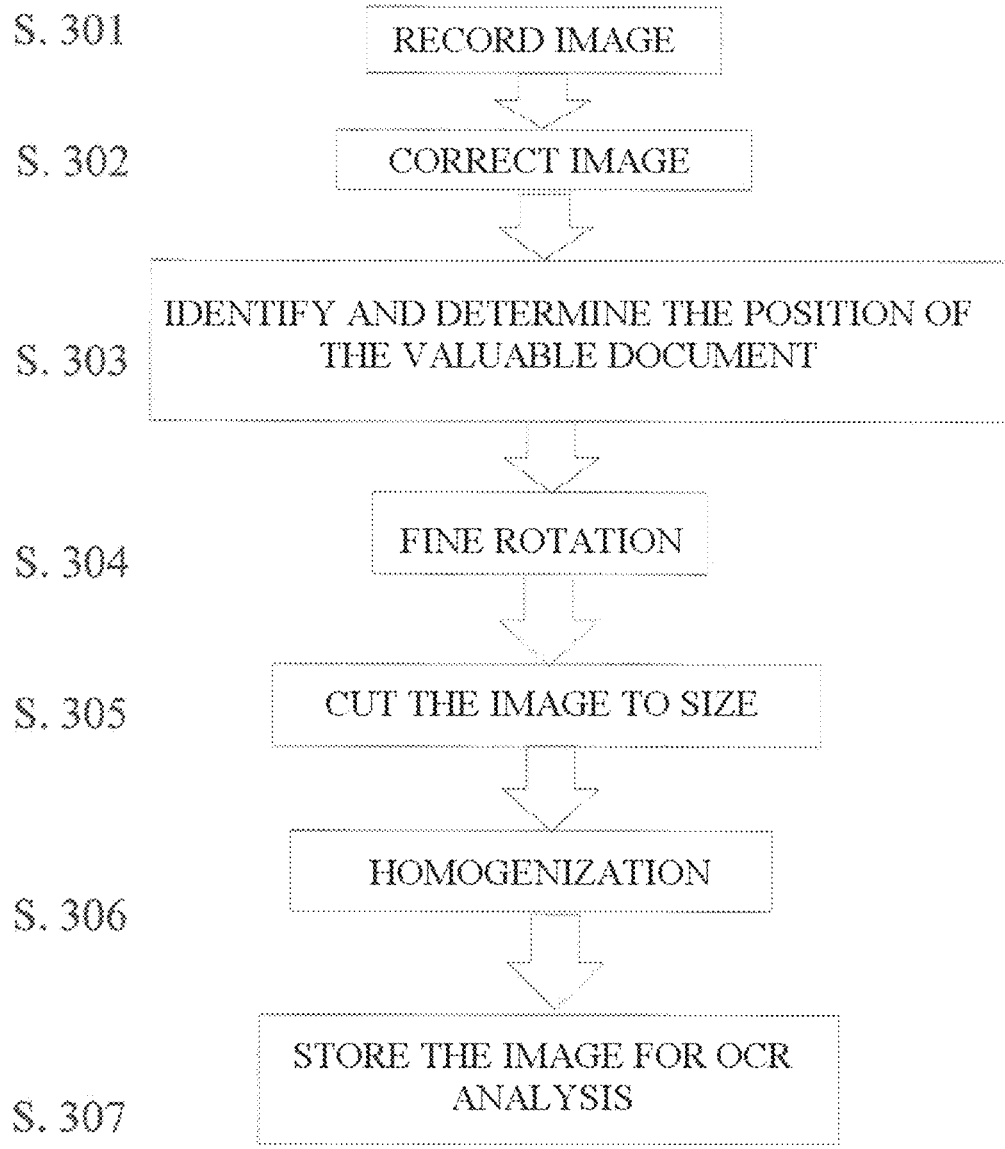
FIG. 3 shows a flowchart of the basic steps of an inventive method for OCR detection of valuable documents in a cash dispenser.

In accordance with FIG. 3, during a method for OCR detection of valuable documents a digital image of the valuable document is firstly acquired in step S301 and is radially corrected as required in step S302 with the aid of the physical properties of the camera objective (focal length, distortion, etc.). Moreover, it is also possible for the image also to be perspectively corrected with the aid of the camera position in relation to the edges of the depositing plate, this being, in particular, dependent on the distance of the camera from the depositing plate, and on the focal length in use, but is not mandatory.

Subsequently, in step S303 the valuable document is identified and its position determined in order to identify a valuable document region, that is to say to identify pixels which correspond to the valuable document deposited on the depositing plate. In step S304, a fine rotation is then performed such that the edges of the valuable document region which is then rotated are aligned with the image edges, that is to say extend substantially parallel thereto. Subsequently in step S305 there is cut to size from the acquired image a rectangular region which corresponds to the valuable document region in which it is intended to execute OCR detection later.

Subsequently, in step S306 the image background is homogenized, and after that an image is stored for later OCR analysis in step S307. The OCR analysis can be executed by means of conventional OCR algorithms which are sufficiently well known and therefore have no need to be considered further.

Figure 4:
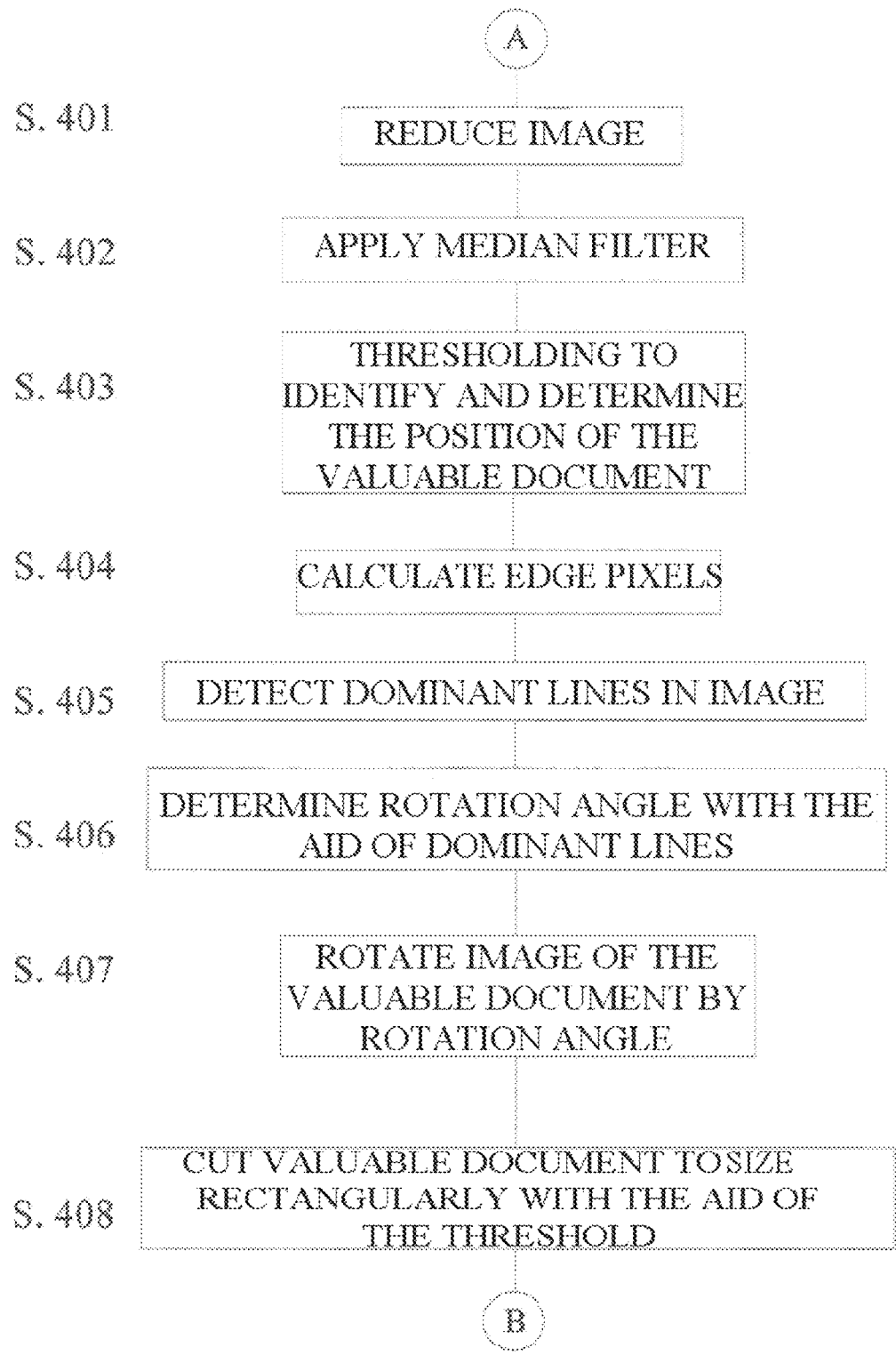
FIG. 4 is a schematic flowchart of the steps of an automatic fine rotation for automatically aligning and cutting to size a rectangular detail as valuable document region in the acquired image.
Figure 5:
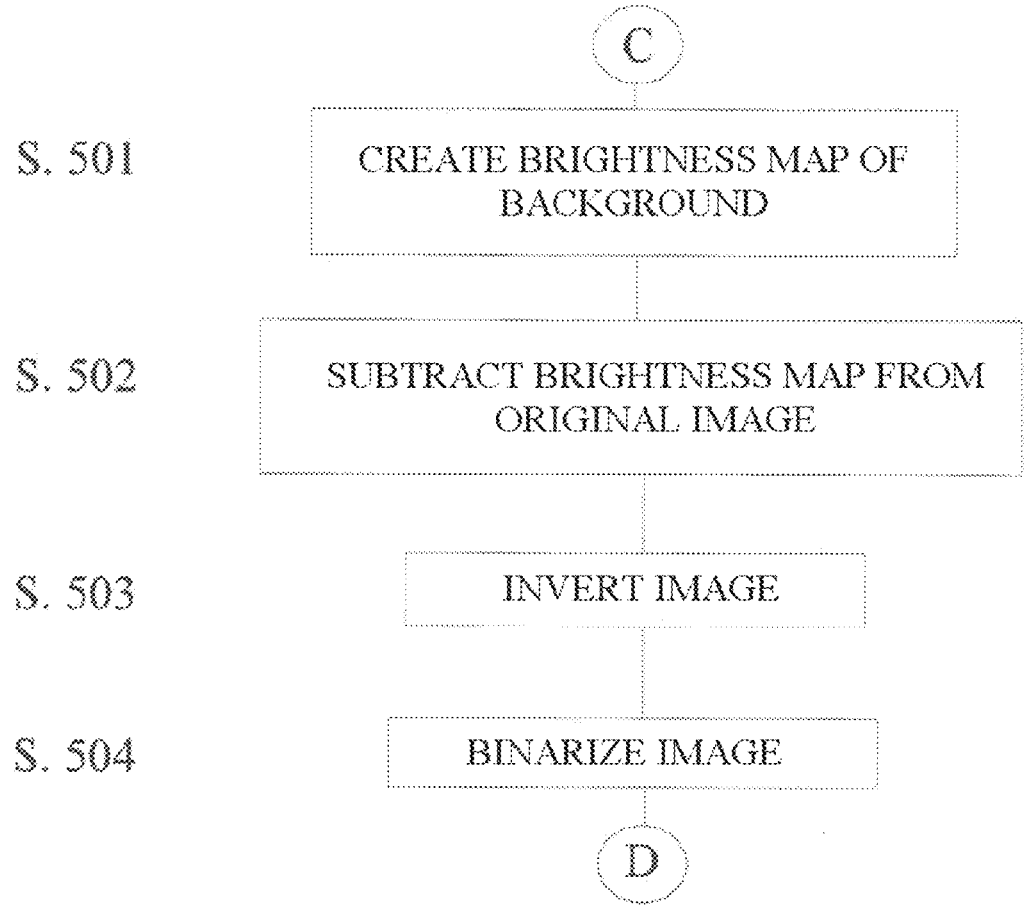
FIG. 5 is a schematic flowchart of the most important steps of a homogenization during an inventive method in preparation for image binarization.

The steps of an automatic fine rotation for aligning the acquired valuable document region are explained below with the aid of FIG. 4. In order to carry out a fine rotation, the valuable document must first be identified, and its position must be determined. To this end, it is advantageous to work on a reduced image, since it is thereby possible to attain a higher processing speed. Moreover, it is advantageous to work from a reduced image in which interfering or superfluous details such as, for example, alphanumeric characters, graphic information, or else dust filaments and interfering lines are removed. The point is that such detailed information is not needed for determining the edges and position of the valuable document. Such details can be removed by using suitable filters including, for example, the median filter on which step S402 is based and in the case of which the grayscale value of the current pixel is replaced by the median of the grayscale values of the current environment, it being possible to prescribe the size of the environment in a variable fashion, for example, via the control section 19.

The valuable document region is then identified in step S403 by automatic thresholding. For example, the image processing section determines whether a pixel value is greater than a predetermined threshold or not, in order thus to binarize an edge image. The threshold can be a fixed value, or a variable which is obtained, for example, with the aid of a variable threshold method. Of course, it is also possible for this purpose to use any other desired algorithms for edge identification.

In the next step S404, the edge pixels of the valuable document region are then calculated. Subsequently, in step S405 a Hough transformation is used to detect the dominant lines in the image. In the Hough method disclosed in U.S. Pat. No. 3,069,654, geometrical objects are detected by creating a dual space in which all possible parameters of the geometrical figure to be found are plotted in the dual space for each point in the image which lies on an edge. Each point in the dual space thereby corresponds to a geometrical object in the image space. When detecting straight lines by means of the Hough transformation, it is necessary firstly to find suitable parameters on a straight line, for example, slope and y-intercept or, preferably, a characterization of a straight line by its Hessian normal form. It is advantageous here that the edges in the starting image were firstly determined in step S404. During the Hough transformation, it is determined for each pixel which line (for example, as determined by angle and distance from the left-hand, upper image corner) runs through it. If the pixel under consideration is an edge pixel, the assessment of the line is raised. The most highly assessed lines then correspond to the dominant lines in the image region.

These dominant lines can then be used in step S406 to easily determine the angle by which the valuable document region must be rotated in order to correct its misalignment and align it parallel to the edges of the field of view or image edges or the depositing plate. Subsequently, the image of the valuable document region is then rotated by this determined rotation angle in step S407. Subsequently, a rectangular image region which contains the valuable document region is cut out in step S408. Owing to the previously performed flush rotation, the alphanumeric characters in this region are aligned flush with the image edges in the case of the underlying rectangular original format, at any rate when an appropriate image correction has been executed previously. Precisely in the case of smaller image formats, such as occur with customary valuable documents, such image distortions are, however, not so interfering that they must necessarily be compensated. Rather, according to the invention it is possible to reliably execute an OCR detection of alphanumeric characters even when the alphanumeric characters are not exactly aligned with the image edges after step S407.

FIGS. 6a-6l summarize the results of the above-named method steps with the aid of the practical example of the detection of a check in the so-called Bolletini check format. In accordance with FIG. 6a, the image of the check acquired by the depositing plate contains the black edge region 60 without any information and the actual valuable document region 61, which contains the graphic image information 62, letters 63, digits 64, and a barcode 65. On view are an inhomogeneous illumination of the image region and a reflection somewhat in the middles of the image, these being the result of reflections from the surface of the depositing plate.

Figure 6A:
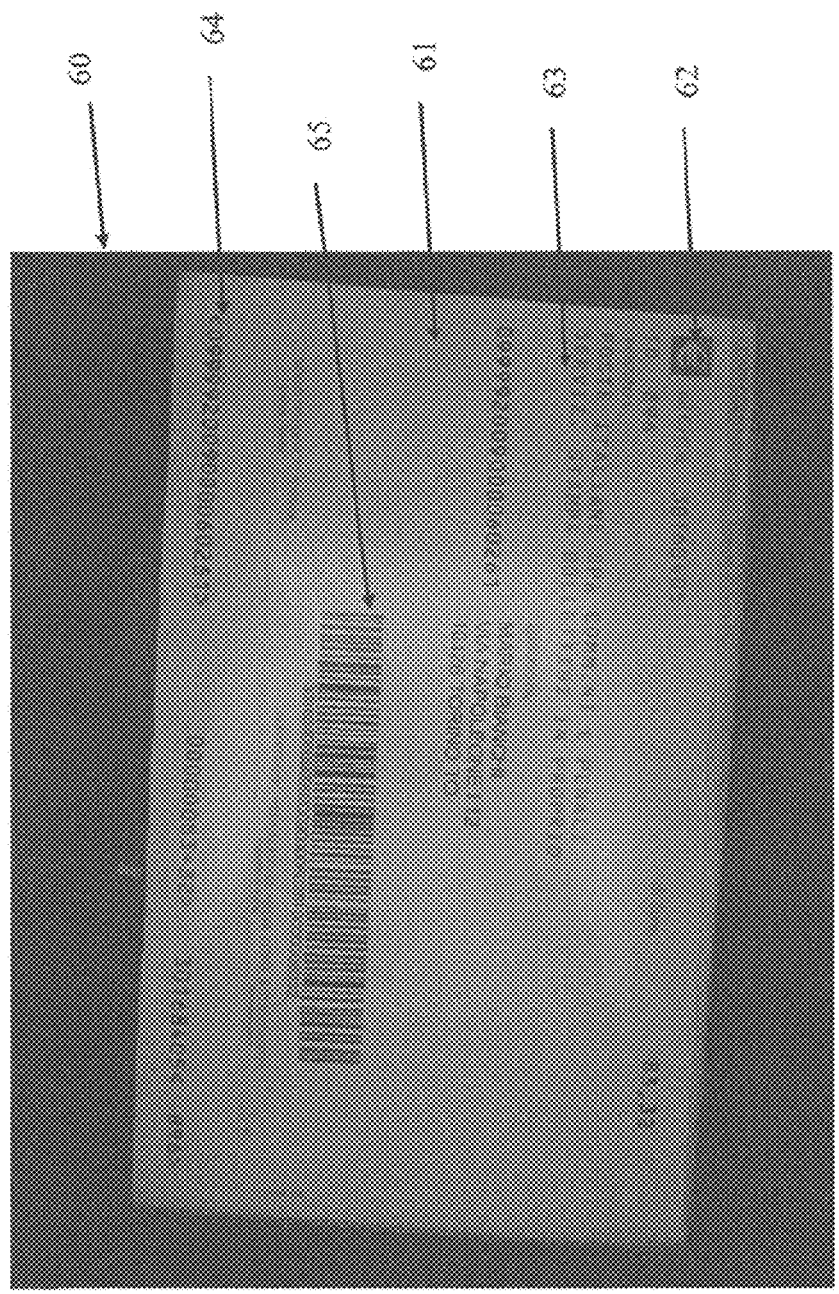
Figure 6B:
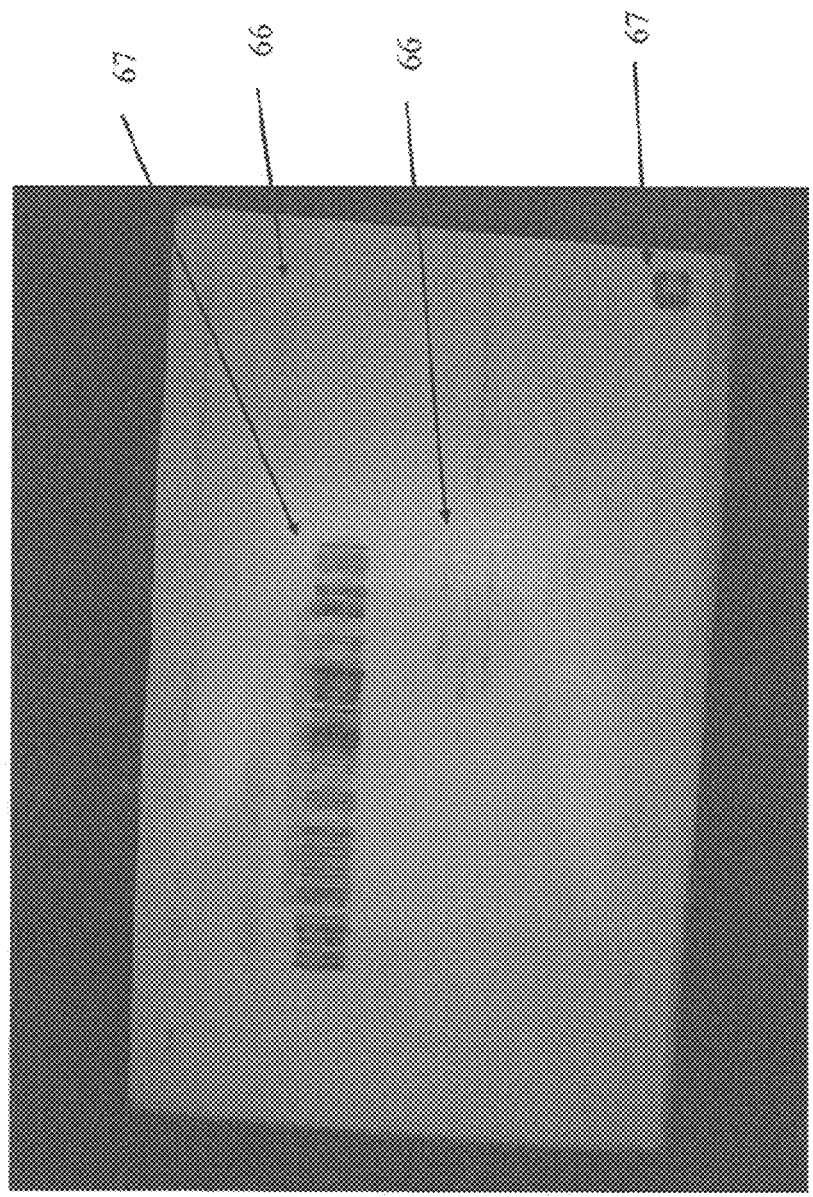
Figure 6C:
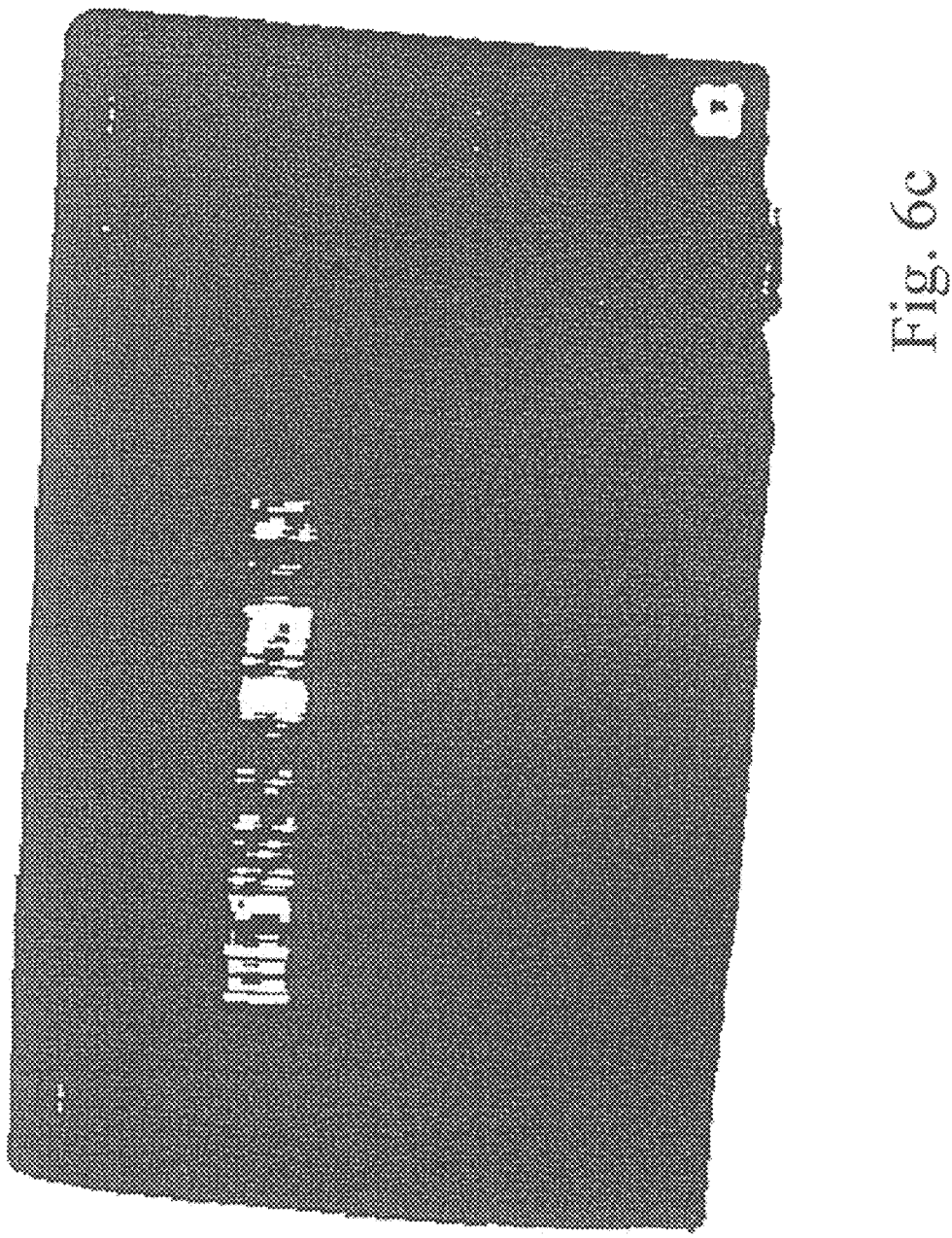

In order quickly to identify and determine the position of the valuable documents, it is preferred to work on a reduced image on which the details, such as font, dust filaments and lines on the check itself have been removed by applying a median filter, as shown in FIG. 6b. On view are Blurry details 66 and furthermore, significant image components in the regions 67, which result from the barcode and the graphic symbol on the check (compare FIG. 6a).

Figure 6D:
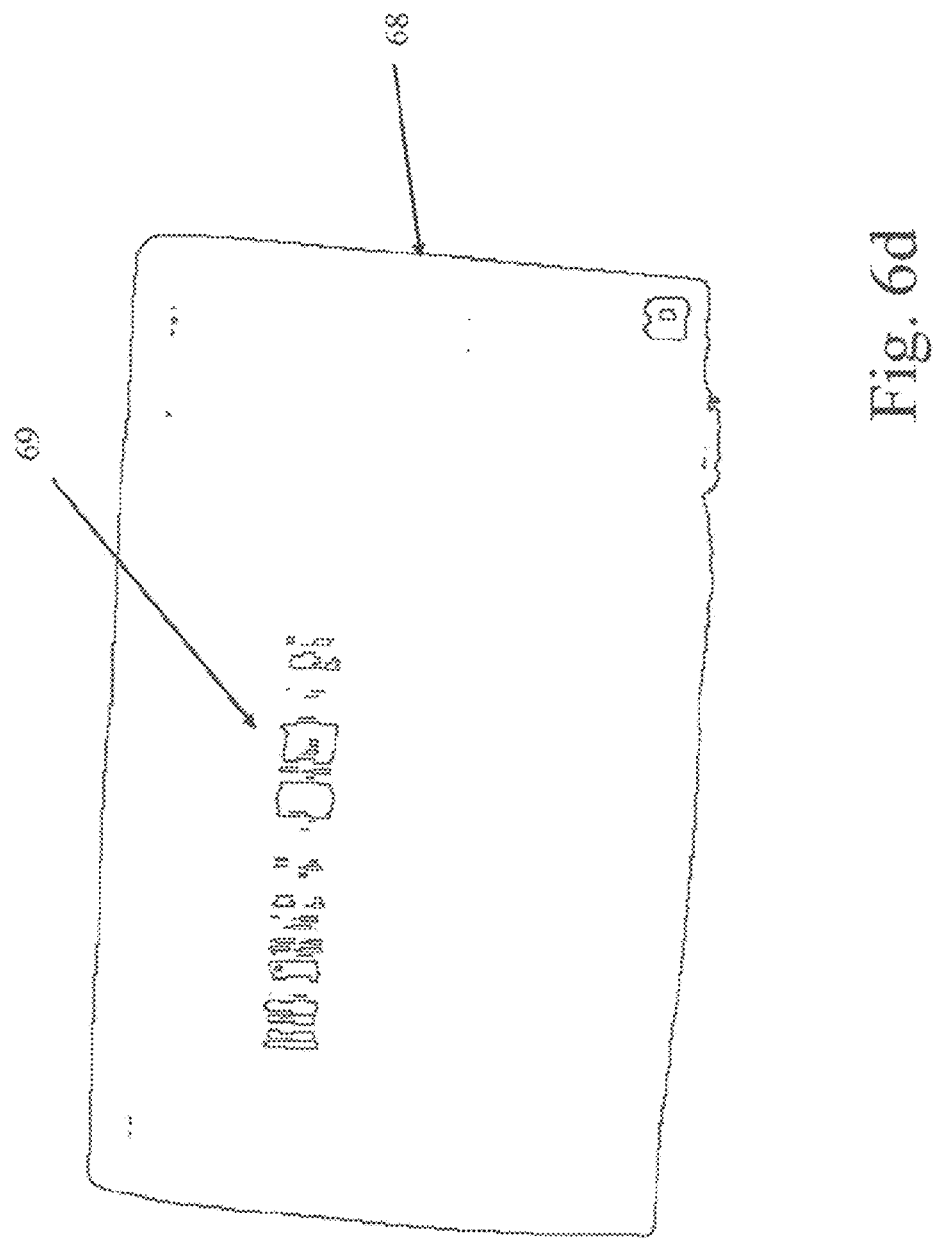
Figure 6E:
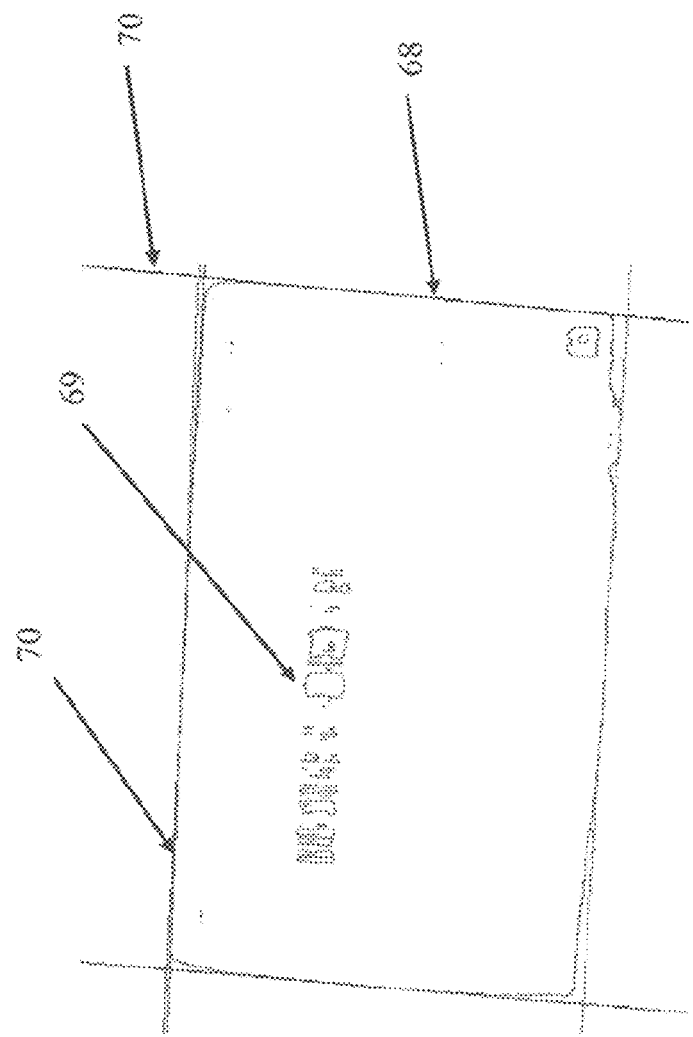

The check is then identified by automatic thresholding (compare FIG. 6c) and an edge filter is applied to determine the edges of dominant regions, as shown in FIG. 6d, specifically the edges 68 of the valuable document, and the edges 69 of further prominent details, in particular resulting from the above-named barcode. The edges are subsequently calculated by means of a Hough transformation. These are indicated in FIG. 6e by the lines 70. It can be seen that said lines do not run parallel to the image edges. However, the rotation angle relevant here can easily be calculated from the edge image in accordance with FIG. 6e.

As shown in FIG. 6a, with the aid of the rotation angle thus determined, the acquired image, that is to say the image having the full image resolution, is rotated, and the regions outside of the calculated edge lines are subsequently cut off (compare FIG. 6e), and this results in the rectangular image region shown in FIG. 6f, which contains the actual valuable document region 61, but also edge regions 60 which additionally result from unavoidable image distortions, for example, resulting from the camera objective. However, it has been shown that OCR detection can also be executed reliably even on original images thus prepared.

Figure 6F:
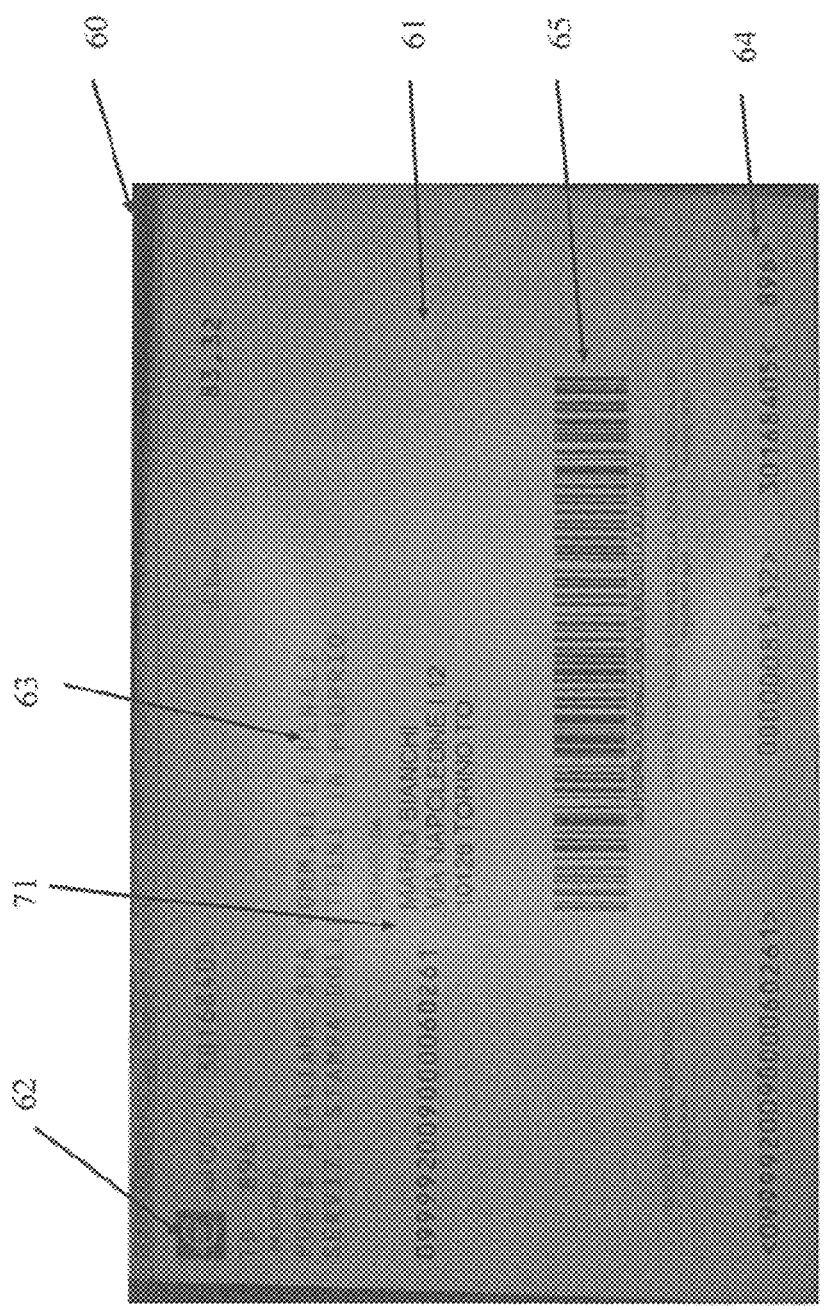
Figure 6G:
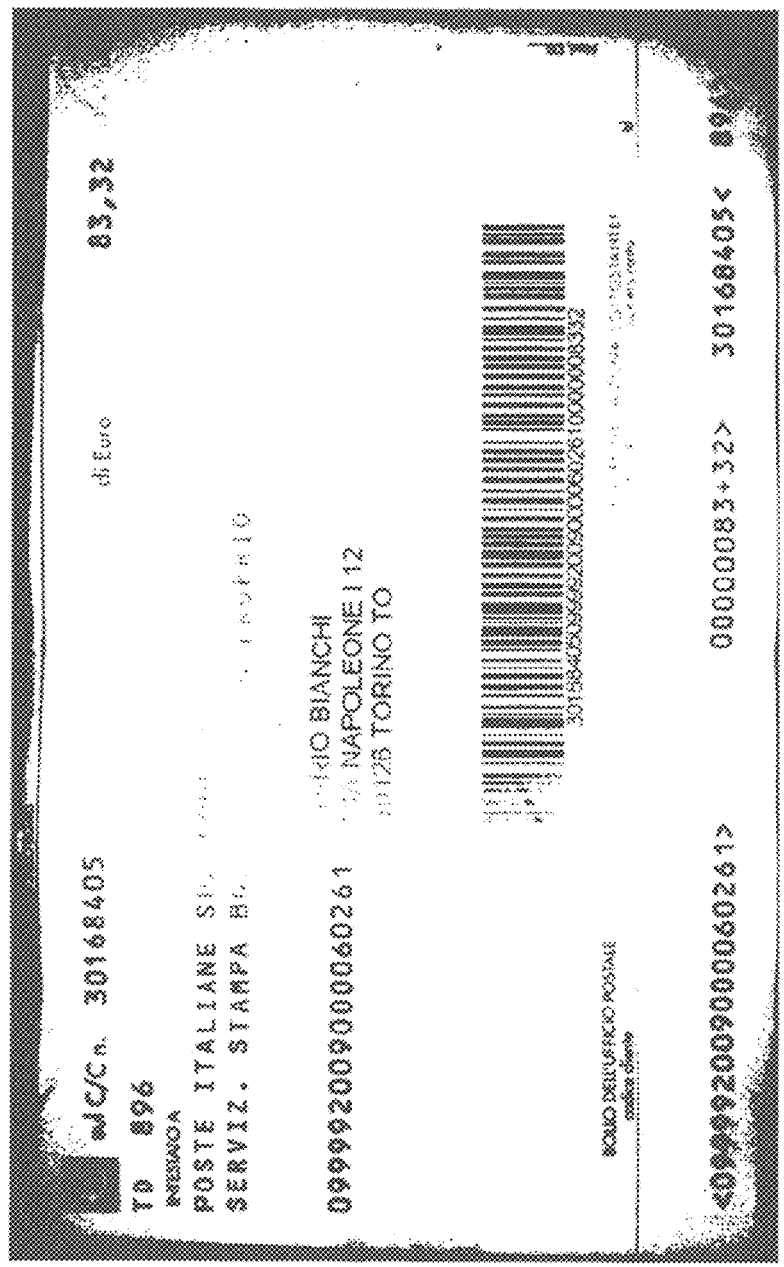

A simple image binarization based on the image information in accordance with FIG. 6f would, however, lead to the result shown in FIG. 6g in which, for example, the text information is missing in the region of the camera owing to reflections in the middle of the image, but is still to be seen unclearly.

Figure 6H:
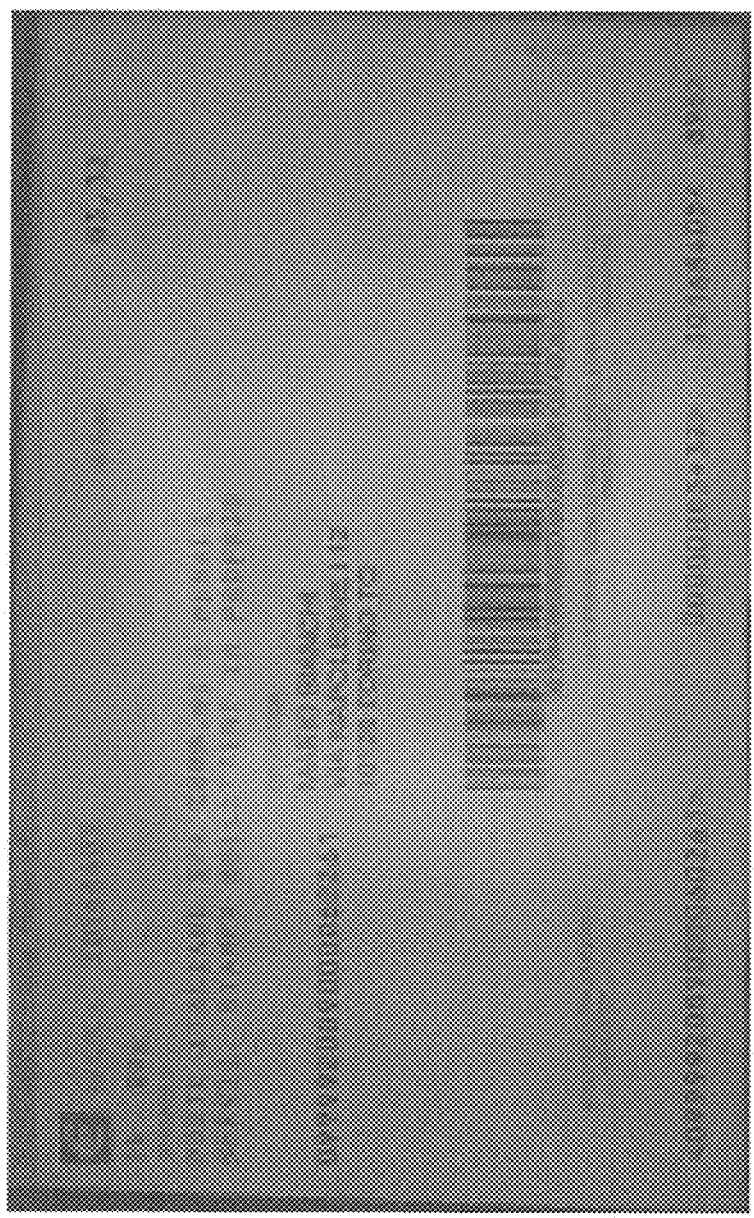
Figure 6I:
Figure 6J:
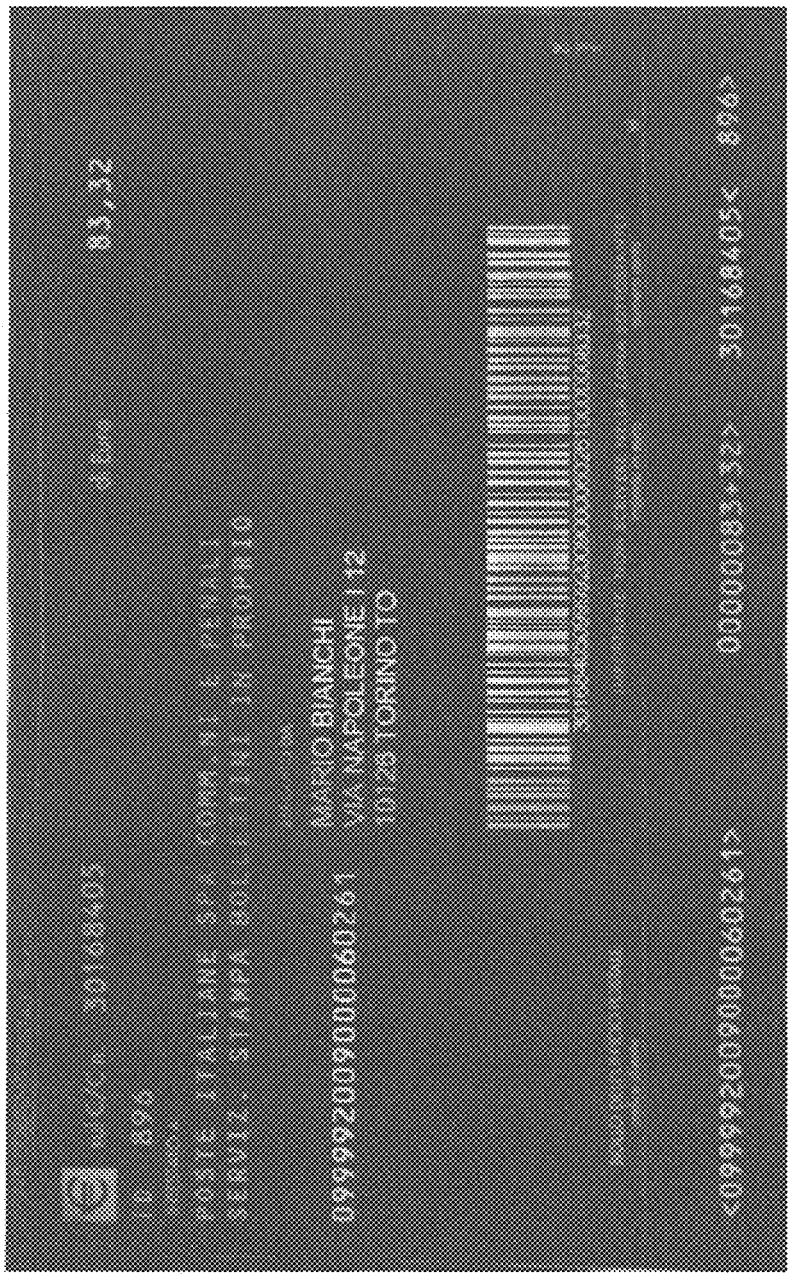
Figure 6K:
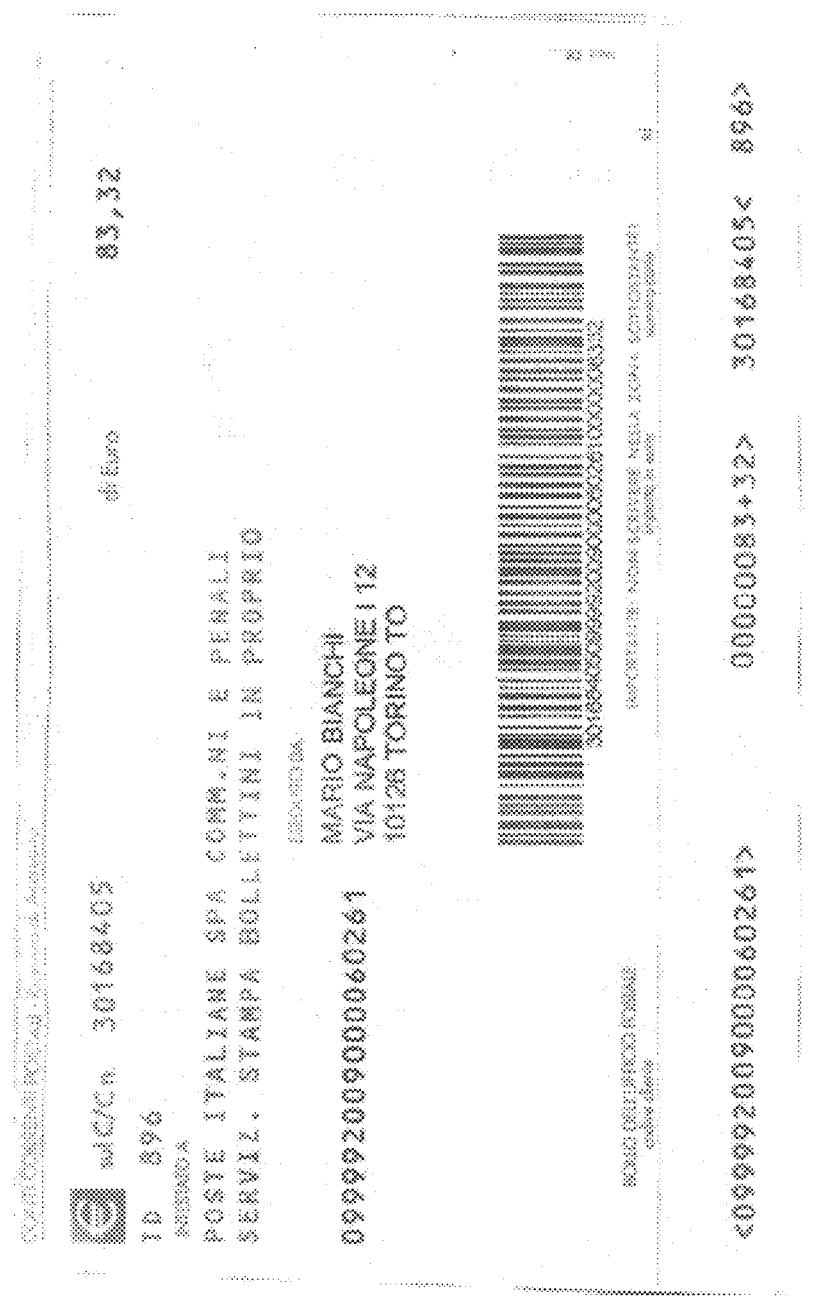
Figure 61:
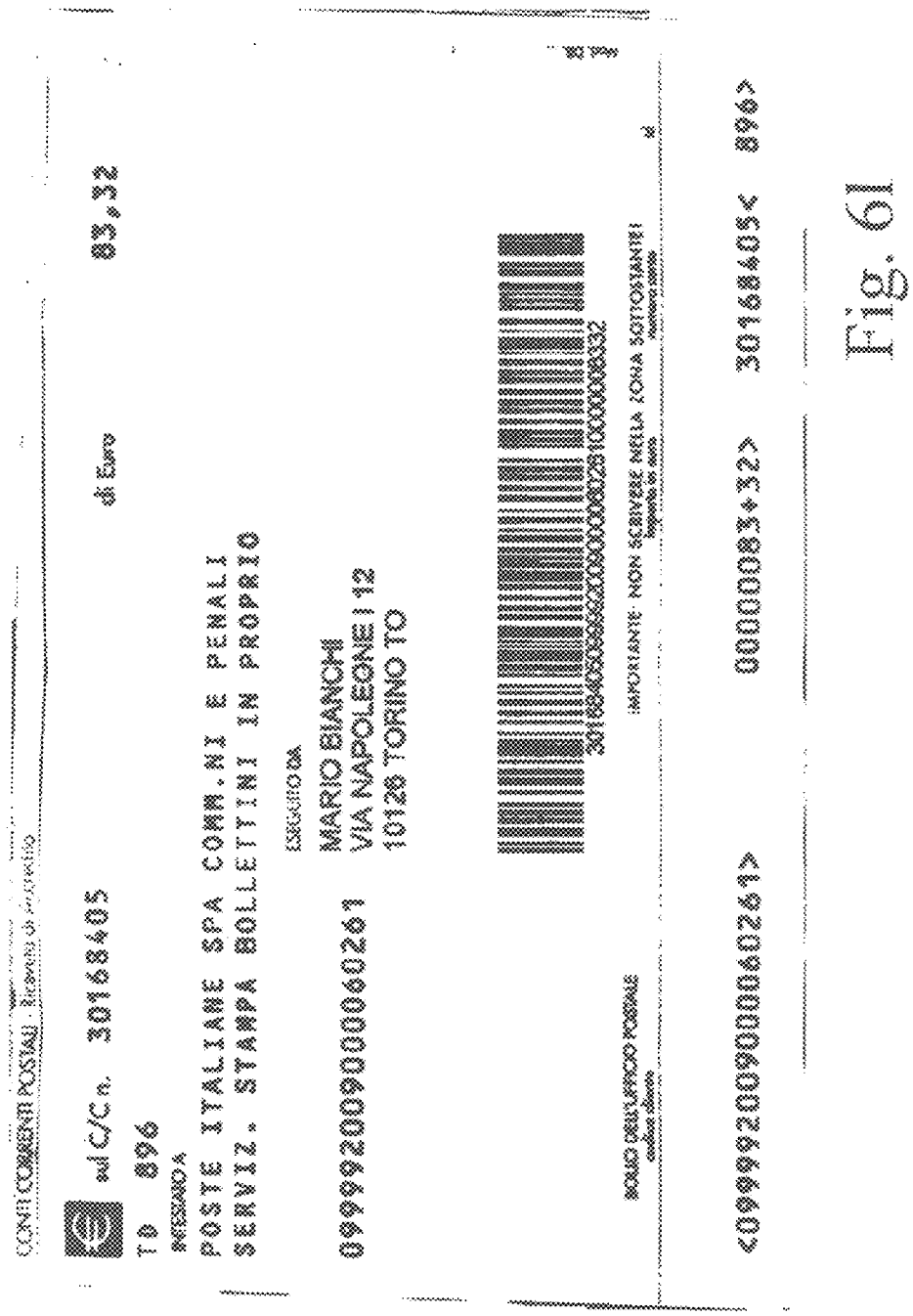

For homogenization, a brightness map of the image background is created and then subtracted in principle from the original image in accordance with FIG. 6f. However, to further speed up the process here it is possible to reduce the image again, for example to ⅛ of the original size. The result is shown in FIG. 6h. A median filter which removes the details from the image is then applied. The background image thereby resulting after the median filtering is in FIG. 6i. In the case of a median filter, a list of the value of all the neighbor pixels is created for each pixel and sorted, and the original pixel is replaced by the value found in the middle of the list. The size of the filter in this case regulates the size of this neighborhood. The filter has the property that coarse structures remain, small structures being smoothed. With relative pixel accuracy, the image generated still contains here the coarse brightness distribution on the check background. This image background is subtracted from the original image in accordance with FIG. 6f, the result being the image in accordance with FIG. 6j. Said image is inverted, and this results in the image in accordance with FIG. 6k. It is to be seen that, for example, the text information in the middle of the image is substantially easier to read and evaluate in this image. Said image is then binarized, that is to say translated into brightness values 1 or 0. The resulting starting image for the OCR detection is shown in FIG. 6l. The text can then be segmented and made available for the subsequent OCR software.

In summary, the inventive method can be used to reliably execute OCR detection by means of a matrix or video camera. It may expressly be pointed out that the invention can be used in any desired self-service machine, in particular in automatic teller machines or cash dispensers whose function is to support the automatic submission of valuable documents such as, for example, checks.

The invention claimed is:

1. A method for optical character recognition (OCR) detection of documents in a self-service machine comprising the steps of:
   A) acquiring an image of a document by means of a digital video or matrix camera;
   B) performing fine rotation on the acquired image by:
      a) reducing the acquired image;
      b) applying a median filter to remove details of the acquired image the details including at least one of alphanumeric characters and graphic information;
      c) determining a position of a document region corresponding to the document;
      d) using an edge filter to determine edge pixels in the acquired image and outputting a binary edge image of the determined edge pixels;
      e) detecting straight edge lines of the document region with the aid of the binary edge image of the determined edge pixels by using a Hough transformation;
      f) determining a rotation angle by which the document region in the image must be rotated for parallel alignment with edges of a field of view of the digital video or matrix camera; and
      g) rotating the document region by the determined rotation angle and cutting off areas outside the detected straight edge lines to establish an intermediate document image; and
   C) forming a homogenized background image by:
      h) establishing a background image by applying the median filter to each pixel in the intermediate document image, wherein applying the median filter includes replacing a pixel value of each pixel with a median pixel value from a number of pixels neighboring the respective pixel, thereby removing smaller details in the intermediate document image to establish the background image;
      i) creating a brightness map from the established background image;
      j) subtracting the brightness map from the intermediate document image to form a negative image; and
      k) inverting the negative image to form a final document image;
   D) binarizing the final document image to segment alphanumeric character information; and
   E) OCR detecting the alphanumeric character information;
   wherein the steps of forming a homogenized background image include further reducing the intermediate document image before applying the median filter to remove the smaller details and thereby obtaining the brightness map with a coarser resolution.

2. The method of claim 1, wherein the step of detecting the straight edge lines using the Hough transformation includes determining, for each pixel, which line runs therethrough, and raising an assessment of each of the detected straight edge lines when the pixel is an edge pixel, the straight edge lines corresponding to the lines most highly assessed.

3. An apparatus for optical character recognition (OCR) detection of valuable documents in a self-service machine, comprising:
   a digital video or matrix camera to acquire an image of a document;
   a median filter to remove details of the acquired image, the details including at least one of alphanumeric characters and graphic information;

an edge filter that determines edge pixels in the acquired image and outputs a binary edge image of the determined edge pixels;
an image processing section that is designed in order:
to reduce the acquired image,
to determine a position of a document region, corresponding to the document, and its edge pixels in the detected image,
to detect straight edge lines of the document region with the aid of the binary edge image of the determined edge pixels by using a Hough transformation,
to determine a rotation angle by which the valuable document region must be rotated in the image for parallel alignment with edges of a field of view of the digital video or matrix camera,
to rotate the document region by the determined rotation angle and to cut off areas outside the detected straight edge lines to establish an intermediate document image,
to establish a background image by applying the median filter to each pixel in the intermediate document image, wherein applying the median filter includes replacing a pixel value of each pixel with a median pixel value from a number of pixels neighboring the respective pixel, thereby removing smaller details in the intermediate document image to establish the background image,
to create a brightness map from the established background image,
to subtract the brightness map from the intermediate document image to form a negative image,
to invert the negative image to form a final document image, and
to binarize the final document image to detect alphanumeric character information in the final document image by OCR detection,
wherein the intermediate document image is further reduced before applying the median filter to remove the smaller details and thereby obtaining the brightness map with a coarser resolution.

4. The apparatus of claim 3, wherein the Hough transformation determines, for each pixel, which line runs therethrough, and raises an assessment of each of the detected straight edge lines when the pixel is an edge pixel, the straight edge lines corresponding to the lines most highly assessed.

5. The apparatus of claim 3, wherein the image processing section is further designed to further reduce the intermediate document image before applying the median filter to remove smaller details to obtain the brightness map with a coarser resolution.

* * * * *